(12) United States Patent
Blanchard

(10) Patent No.: X1918
(45) Date of Patent: May 7, 1813

(54) SHEARING MACHINE, HORIZONTAL

(76) Inventor: Thomas Blanchard

Thomas Blanchard of the City, and State of New York

Letters Patent.

The schedule referred to in these Letters Patent and making
part of the same, containing a description in the words of the
said Thomas Blanchard himself of his horizontal shearing
Machine
The invention of this improvement in machinery for
shearing Cloth, called the horizontal shearing machine consists
in the constructing the moving horizontal shear so as to have it
moved back and forth in the operation of cutting with two cranks
on an axis, with a crank near each end, together with the other
necessary parts constructed in the manner required for this machine
A proper wooden frame about three feet high and as wide as the
cloth intended to be generally sheared may require, is made of good
hard timber, having its bottom sills framed together which receive
and supports two posts which all the operating parts of the machine
such as shears, rollers, rolling bench, beams, band, wheel, shafts
slats and cross bars are fixed. To complete this frame two cross
beams are fixed on the outside of said posts about sixteen or
twenty inches from said sills and to the ends of these cross beams
which may be three feet long or more are fixed, first the rolling
beam on which the cloth to be sheared is first wound & at the
other ends of said cross beams is fixed the axis containing the
cranks to give motion to the shear. A cross bar is also put
through said posts from side to side being at right angles and
at the middle of said outside cross beams and secured in said
posts with wedges. Upon the upper edge of this cross bar the
edge of the under and stationary shear rests, that is when shea-
ring the cloth passes between the edge of the stationary shear
and the upper edge of this cross bar, which supports the said shear. The edge of said cross bar must be straight
This stationary shear is a flat plate of steel as long as
the width of the cloth may require and about three inches wide
having at each end a gudgeon in the line of the back of said
shear plate which said gudgeons go into the sides of said posts
so that said shear plate is nearly horizontal & its cutting
edge perfectly straight & fitted to the edge of the cross bar
This shear plate being thus hung by its end gudgeons is easily
turned up when the cloth is put in to be sheared so as to make
it convenient to put the cloth between the said cross bar and said
shear into the rollers under them which feed in the cloth
in a regular manner when shearing
The moving shear is placed over the stationary shear
consisting of two or more plates, which form a proper angle
with the stationary shear as may be necessary for them to
have, When the moving shears moves forward it is raised
up and when it is forward it is then pressed down against
the stationary shear and moved back when it cuts the knap
off of the cloth as is wanted. The plates of the moving shear
stand edgewise or their width being nearly perpendicular are
fixed by means of iron clasps to a cross bar. as the frame which
crossbar or shear frame, is fixed to the horizontal pit staves of
the cranks that give motion to the moving shear in the manner
above mentioned These two pit or crank staves extend horizon
tally about seventeen inches from said cranks a little beyond
the shears and the ends there are connected by joint pins
to two perpendicular arms which arms are at the upper ends
fixed by joint pins to a bar extending across from post to post;
and the moving shear being, thus fixed firmly into a frame
connected to said cranks. has thereby such a motion given
to it as to be peculiarly advantageous in shearing cloth, as
said crank staves have something of a spring in their operation
which favours the cutting of the shears. The joint pins to the upper ends of said arms, are fixed so as to be easily taken out
and the moving shear and its frame raised up out of the way
when the cloth is first put into the machine to be sheared. The
axis of said cranks has at each end centres which run in
the ends of adjusting screws by which said cranks are kept
tight said cranks are formed of a suitable bar of iron so
bent near its ends as to form two cranks on the same side of
the bar of iron, on one end of this axis a wooden whirl is fixed
for the bands by which it is put in motion. The said crank staves
are connected to said cranks with proper boxes so made as
to be tightened with screws & kept firm, and the cross bar to
which the arms connected to said crank staves are fixed, is made
to be elevated or depressed so as to bring the edges of the shears
together in the same wear [illegible]
A long brush made to revolve on an axis is placed in the
frame and its gudgeons go into said posts of the frame of the
machine & this brush is turned by a band going round a whirl
on one end of the axis of said brush so as to brush the knap
of the cloth up to the edge of the shears when it is sheared off.
Between this revolving long brush, and the rolling beam on
which the cloth is first wound is placed a slat over a cross bar
of the frame, and this slat lying upon the cloth, presses it down
on said cross bar so as to prevent the cloth from being drawn in
to the shears in too slack a manner, at each end of this [illegible]
a weight is suspended to give a proper degree of obstruction
to the motion of the cloth as the same is drawn into the machine
on one end of said rolling beam, a weight is also suspended by
a rope which goes round the rolling beam in manner like a
band, & this is to obstruct said rolling beams turning
round too easily, The axis of the band wheel which gives
motion to this Machine is placed over the shears and a little
backward of them and the gudgeons run in the upper ends of said
posts of the frame, The band wheel on this axis to on this axis to carry the said crank shaft and revolving Brush, is about
a foot in diameter & the wheel on said crank shaft about
two inches in diameter more or less. at the other end of this band wheel
shaft the gudgeon extends out beyond the post of the frame two or
three inches and has four conical cogs put through it so as to take
into the holes made in the wide leather band which goes round
a large band wheel on the gudgeon of the main roller which
draws in the cloth when shearing. And the calculation here
is to have the roller which draws in the cloth the band wheel
on the gudgeon of this roller (and the gudgeon and cogs in it) of
the great band wheel shaft so proportioned both as to size and mo-
tion as to have the cloth carried in one sixteenth part of an inch or
thereabouts for every cut or operation of the shears. One of the said
rollers which draw in the cloth is hung by its gudgeons in a frame
and so contrived as to have this roller compressed against the
other by a Spring [illegible] lever so as to hold the cloth tight between
them & be sure of drawing it in as wanted. The [illegible] roller
is covered with cloth. A long crib or trough is fixed at
the back and a little under the stationary shear ~~to receive~~ to receive the
knap as cut off and keep it from falling down on the cloth
after it is sheared. This machine may be carried by water
or any other adequate power; And it is to be noted that
the end of the plates forming the moveable shear run by each
other a little so that a complete cutting edge is formed from
one end to the other of the shear. The rollers must be turned
perfectly round, and true, as also their iron gudgeons.
All parts of the machine requiring adjustments are
contrived with adjusting screws and wedges Witnesses
John Fairbanks
A. W. Fuller Thomas Blanchard